(12) United States Patent
Hsin

(10) Patent No.: US 12,470,248 B2
(45) Date of Patent: Nov. 11, 2025

(54) METHOD AND SYSTEM FOR CONTROLLING A MODAL ANTENNA WITH ACKNOWLEDGEMENT

(71) Applicant: KYOCERA AVX Components (San Diego), Inc., San Diego, CA (US)

(72) Inventor: Jesse Shihchieh Hsin, San Diego, CA (US)

(73) Assignee: KYOCERA AVX Components (San Diego), Inc., San Diego, CA (US)

( * ) Notice: Subject to any disclaimer, the term of this patent is extended or adjusted under 35 U.S.C. 154(b) by 0 days.

(21) Appl. No.: 18/495,036

(22) Filed: Oct. 26, 2023

(65) Prior Publication Data

US 2024/0154640 A1  May 9, 2024

Related U.S. Application Data

(60) Provisional application No. 63/423,241, filed on Nov. 7, 2022.

(51) Int. Cl.
| | |
|---|---|
| *H04B 1/401* | (2015.01) |
| *H04B 1/48* | (2006.01) |
| *H04B 3/04* | (2006.01) |

(52) U.S. Cl.
CPC ............ *H04B 1/401* (2013.01); *H04B 1/48* (2013.01); *H04B 3/04* (2013.01)

(58) Field of Classification Search
CPC . H04B 1/38; H04B 1/40; H04B 1/401; H04B 1/48; H04B 3/04; H04B 3/06
(Continued)

(56) References Cited

U.S. PATENT DOCUMENTS

| | | |
|---|---|---|
| 5,812,066 A | 9/1998 | Terk et al. |
| 6,765,536 B2 | 7/2004 | Phillips et al. |

(Continued)

FOREIGN PATENT DOCUMENTS

| | | |
|---|---|---|
| CN | 110266326 | 9/2019 |
| WO | WO 2021172880 | 9/2021 |

OTHER PUBLICATIONS

Regan et al., "Current Sense Circuit Collection Making Sense of Current", Linear Technology Application Note 105, https://www.analog.com/en/app-notes/an-105fa.html, Dec. 2005, 118 pages.
(Continued)

*Primary Examiner* — Young T. Tse
(74) *Attorney, Agent, or Firm* — Dority & Manning, P.A.

(57) ABSTRACT

An antenna system is provided. In one example implementation, the antenna system may include a modal antenna that is operable in a plurality of different modes, and each mode may be associated with a different radiation pattern. The antenna system may include a tuning circuit configured to operate the modal antenna in the plurality of different modes. A transmission line may be coupled to the tuning circuit. The antenna system may further include one or more control devices. The control devices may be configured to modulate a control signal onto a radio frequency (RF) signal to generate a modulated signal for communication over the transmission line to the tuning circuit. The control devices may be further configured to generate an acknowledgement (ACK) signal based at least in part on the control signal.

19 Claims, 15 Drawing Sheets

(58) Field of Classification Search
USPC ............ 375/219, 220, 257, 267; 342/74, 81;
343/777, 815, 817–819, 833, 834;
455/13.3, 14, 63.4
See application file for complete search history.

(56) References Cited

U.S. PATENT DOCUMENTS

| | | | |
|---|---|---|---|
| 6,987,493 B2 | 1/2006 | Chen |
| 7,068,234 B2 | 6/2006 | Sievenpiper |
| 7,215,289 B2 | 5/2007 | Harano |
| 7,830,320 B2 | 11/2010 | Shamblin et al. |
| 7,911,402 B2 | 3/2011 | Rowson et al. |
| 8,446,318 B2 | 5/2013 | Ali et al. |
| 9,014,297 B2 | 4/2015 | Bisig |
| 9,065,496 B2 | 6/2015 | Roswson et al. |
| 9,231,669 B2 | 1/2016 | Desclos et al. |
| 9,325,543 B2 | 4/2016 | Desclos et al. |
| 9,425,497 B2 | 8/2016 | Pajona et al. |
| 9,439,151 B2 | 9/2016 | Zhu et al. |
| 9,479,242 B2 | 10/2016 | Desclos et al. |
| 9,590,703 B2 | 3/2017 | Desclos et al. |
| 9,654,230 B2 | 5/2017 | Desclos et al. |
| 9,755,305 B2 | 9/2017 | Desclos et al. |
| 9,755,580 B2 | 9/2017 | Desclos et al. |
| 9,768,991 B2 | 9/2017 | Desclos et al. |
| 9,923,588 B2 | 3/2018 | Wedig et al. |
| 10,263,817 B1 | 4/2019 | Roe et al. |
| 10,587,438 B2 | 3/2020 | Roe et al. |
| 10,693,520 B2 | 6/2020 | Petrovic et al. |
| 11,126,905 B2 | 9/2021 | Zajic et al. |
| 11,189,925 B2 | 11/2021 | Eslami |
| 2009/0074122 A1 | 3/2009 | Huang et al. |
| 2012/0229307 A1 | 9/2012 | Tsai |
| 2013/0012144 A1 | 1/2013 | Besoli et al. |
| 2014/0133525 A1 | 5/2014 | Desclos et al. |
| 2016/0036127 A1* | 2/2016 | Desclos ................. H01Q 5/378 343/745 |
| 2016/0048163 A1 | 2/2016 | Degner et al. |
| 2017/0012681 A1 | 1/2017 | Buliga et al. |
| 2017/0155194 A1 | 6/2017 | Kanno |
| 2017/0265090 A1 | 9/2017 | Lee et al. |
| 2017/0338557 A1 | 11/2017 | Desclos et al. |
| 2018/0351255 A1 | 12/2018 | Singh et al. |
| 2019/0273531 A1* | 9/2019 | Waxman ................ H04B 1/715 |
| 2020/0227828 A1 | 7/2020 | Rootsey et al. |
| 2020/0251823 A1 | 8/2020 | Singh |
| 2020/0304276 A1* | 9/2020 | Hoffmann ............ H04L 5/0048 |
| 2021/0036424 A1 | 2/2021 | Eslami |
| 2021/0234274 A1 | 7/2021 | Eslami et al. |
| 2021/0296765 A1 | 9/2021 | Eslami et al. |
| 2021/0344383 A1 | 11/2021 | Pajona et al. |
| 2022/0085503 A1 | 3/2022 | Eslami |
| 2022/0131266 A1 | 4/2022 | Singh et al. |
| 2022/0231418 A1 | 7/2022 | Desclos et al. |

OTHER PUBLICATIONS

International Search Report and Written Opinion PCT/US2023/035985, mailed on Feb. 20, 2024, 10 pages.

\* cited by examiner

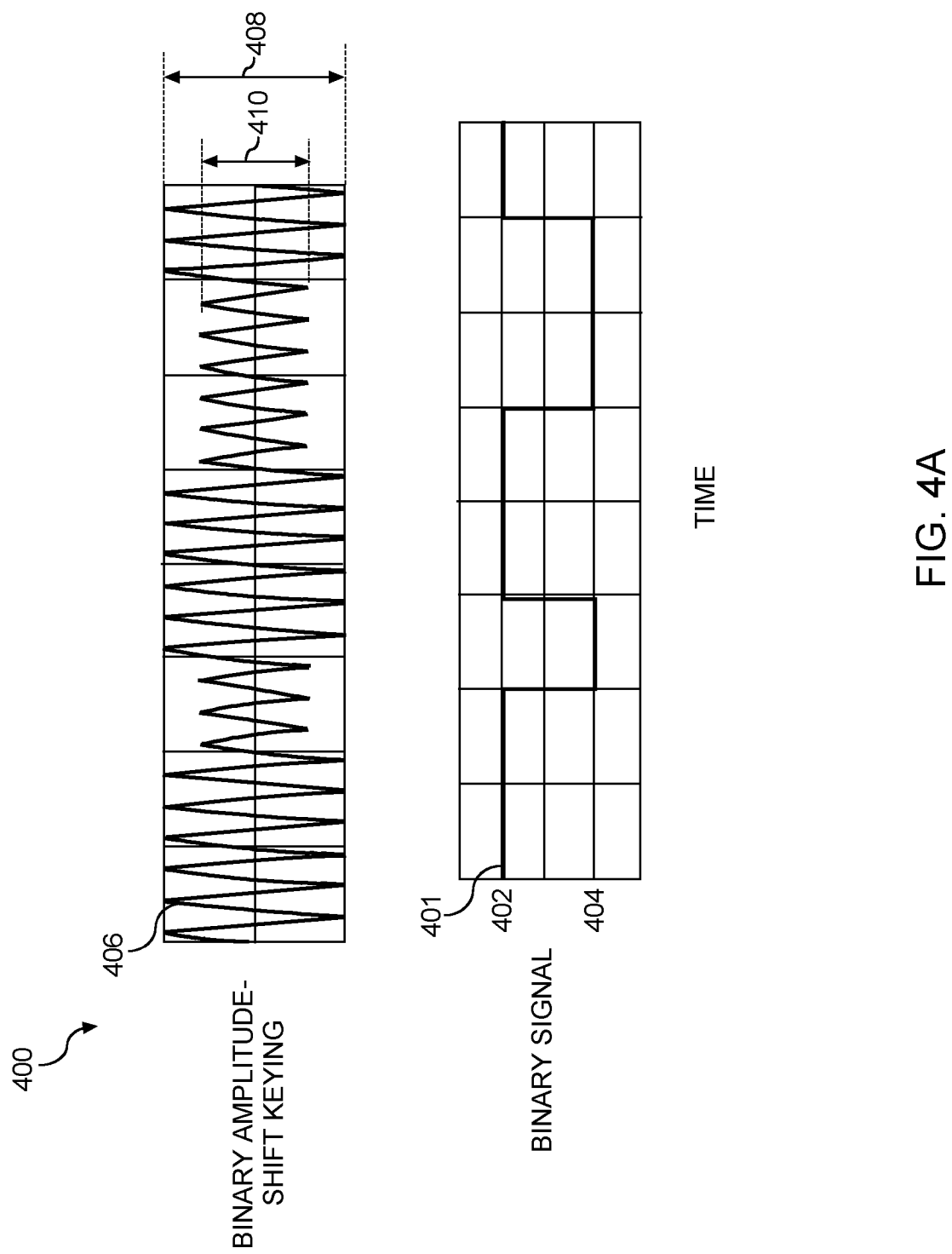

METHOD AND SYSTEM FOR CONTROLLING A MODAL ANTENNA WITH ACKNOWLEDGEMENT

PRIORITY CLAIM

The present application claims the benefit of priority of U.S. Provisional Application Ser. No. 63/423,241, filed Nov. 7, 2022, titled "Method and System for Controlling a Modal Antenna with Acknowledgement," which is incorporated herein by reference in its entirety and for all purposes.

FIELD

Example aspects of the present disclosure relate to antennas.

BACKGROUND

Modal antennas are being increasingly used in wireless communication, for instance in smartphone handsets. Such antennas generally provide improved signal quality and a more compact form factor than traditional passive antennas. One modal antenna configuration involves a parasitic element configured to alter a radiation pattern associated with a driven element. In this manner, modal antennas can be configurable in a plurality of different modes. Furthermore, each of the plurality of modes can have a distinct radiation pattern and/or polarization

SUMMARY

Aspects and advantages of embodiments of the present disclosure will be set forth in part in the following description, or can be learned from the description, or can be learned through practice of the embodiments.

One example aspect of the present disclosure is directed to an antenna system comprising a modal antenna operable in a plurality of different modes, and each of the plurality of modes can be associated with a different radiation pattern. The antenna system may include a tuning circuit configured to control the modal antenna to operate in each of the plurality of modes. The antenna system may include a transmission line coupled to the tuning circuit. The antenna system may include one or more control devices configured to modulate a control signal onto a radio frequency (RF) signal to generate a modulated signal for communication over the transmission line to the tuning circuit. The one or more control devices may be further configured to generate an acknowledgement (ACK) signal based at least in part on the control signal.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 4A illustrates a series of time-aligned charts representing simplified examples of binary amplitude-shift keying modulation;

DETAILED DESCRIPTION

Figure 1A:
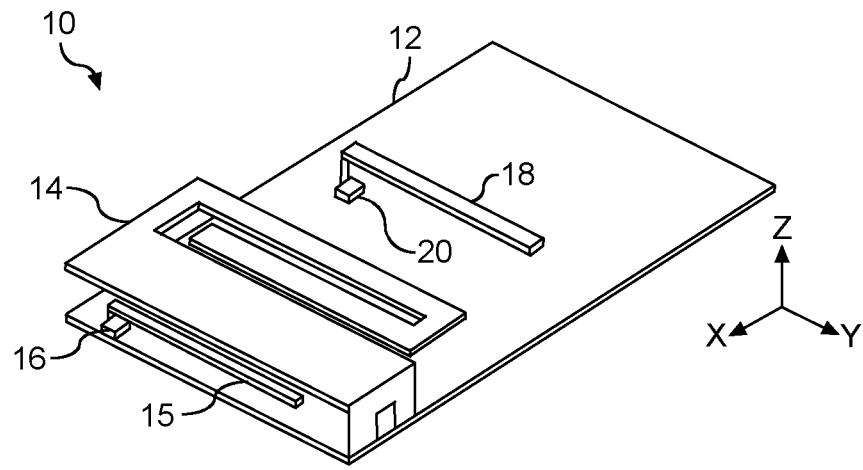
FIG. 1A illustrates an embodiment of an antenna according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure relate generally to the field of antenna control. For instance, example aspects of the present disclosure relate to the control of modal antennas configured to operate in a plurality of different modes.

Modal antennas are being increasingly used in wireless communication. Such antennas generally provide improved signal quality and a more compact form factor than traditional passive antennas. Modal antennas can be configurable in a plurality of different modes having a distinct radiation pattern and/or polarization state in each different mode.

An antenna system can include a modal antenna including a driven element and a parasitic element positioned proximate to the driven element. The antenna system can include a tuning circuit that is configured to control an electrical characteristic associated with the parasitic element to operate the modal antenna in the plurality of different modes.

The antenna systems can include a radio frequency (RF) circuit and a transmission line (e.g., a single coaxial cable) coupling the RF circuit to the modal antenna. The RF circuit can be configured to modulate a control signal onto an RF signal using, for instance, amplitude-shift keying modulation or other suitable modulation to generate a transmit signal for communication over the transmission line to the tuning circuit. The tuning circuit can be configured to demodulate the control signal such that the tuning circuit can adjust a mode of the modal antenna based at least in part on the control signal. For instance, the tuning circuit can control the modal antenna to operate in a selected mode of the plurality of modes based at least in part on the control signal.

In some instances, the control signal communicated to the tuning circuit by the RF circuit is unidirectional. More particularly, when the RF circuit modulates the control signal onto the RF signal for communication over the transmission line to the tuning circuit, the tuning circuit does not send an ACK (acknowledgement) signal or a NAK (not acknowledgement) signal back to the RF circuit to confirm receipt of the control signal. Thus, the RF circuit does not know whether the control signal was well-received by the tuning circuit. The RF circuit likewise does not know the real-time configuration of the modal antenna. More particularly, the RF circuit does not know which mode of the plurality of modes the modal antenna is operating in at any given moment.

According to example aspects of the present disclosure, the antenna system can include a current-mode back-channel comprising modulation and demodulation circuitry. More particularly, the antenna system can include control device (s) configured to generate a modulated signal for communication over the transmission line to the tuning circuit by modulating a control signal onto an RF signal. The control device(s) can be further configured to generate an acknowledgement (ACK) signal based at least in part on the control signal received by the tuning circuit. Aspects of the present disclosure are discussed with reference to an ACK signal. As used herein, an ACK signal can include a not acknowledgment (NAK) signal without deviating from the scope of the present disclosure.

According to example aspects of the present disclosure, the control device(s) can be configured to generate an ACK signal based at least in apart on a control signal received by the tuning circuit. More particularly, the control device(s) can be configured to encode a plurality of bits in accordance with a coding scheme. For example, the coding scheme can specify a unique code for each antenna mode of the plurality of modes. In some instances, the coding scheme can specify a unique code for a general acknowledgement (general ACK) request and a plurality of specific acknowledgement (specific ACK) requests.

In some instances, the control device(s) can include current-source circuitry and current-sensing circuitry. More particularly, the control device(s) can include a switchable current source configured to operate as a back-channel modulator and a current sensor configured to operate as a back-channel receiver. The back-channel modulator can be coupled to the tuning circuit and configured to generate an ACK signal, such as a pulsed DC current signal, based at least in part on a control signal received by the tuning circuit. The back-channel receiver can be coupled to the RF circuit and configured to monitor and/or sense the ACK signal generated by the back-channel modulator.

The systems and methods according to example embodiments of the present disclosure provide a number of technical effects and benefits. For instance, example aspects of the present disclosure provide a readback mechanism for the antenna system. More particularly, by providing a current-mode back-channel, the present disclosure provides an ACK signal mechanism and/or real-time indicators indicative of configuration metrics of the antenna system. In this way, the present disclosure can, in some instances, provide for an antenna system configuration readback mechanism that operates over the transmission line. The resulting current-mode back-channel may provide accurate and efficient control over the operation of the modal antenna and the antenna system.

FIG. 1A illustrates an embodiment of a modal antenna 10 in accordance with aspects of the present disclosure. The modal antenna 10 may include a circuit board 12 (e.g., including a ground plane) and a driven antenna element 14 disposed on the circuit board 12. A first parasitic element 15 may be positioned proximate the driven antenna element 14. For example, the first parasitic element 15 may be positioned such that current in the first parasitic element 15 affects the radiation pattern of the driven element. For instance, an antenna volume may be defined between the circuit board (e.g., and the ground plane) and the driven antenna element 14. The first parasitic element 15 may be positioned at least partially within the antenna volume.

A first active tuning element 16 may be coupled with the first parasitic element 15. The first active tuning element 16 can be a passive or active component or series of components and may be configured to alter a reactance on the first parasitic element 15 either by way of a variable reactance, or shorting to ground, resulting in a frequency shift of the antenna.

In some embodiments, a second parasitic element 18 may be disposed adjacent the circuit board 12 and proximate the driven antenna element 14 such that current in the second parasitic element 18 affects the radiation pattern of the driven element. The second parasitic element 18 may be positioned outside of the antenna volume. The driven antenna element 14 may have a width 19. The second parasitic element 18 may be spaced apart from the driven antenna element 14 by a spacing distance 21. A ratio of the width 19 of the driven antenna element 14 to the spacing distance 21 may range from about 0.2 to about 10, in some embodiments from about 0.5 to about 8, and in some embodiments from about 1 to about 5.

The second parasitic element 18 may further include a second active tuning element 20 which may individually include one or more active and/or passive components. The second parasitic element 18 may be positioned adjacent the driven antenna element 14 and may also be positioned outside of the antenna volume.

The described configuration may provide an ability to shift the radiation pattern characteristics of the driven antenna element by varying a reactance thereon. Shifting the antenna radiation pattern can be referred to as "beam steering". In instances where the antenna radiation pattern comprises a null, a similar operation can be referred to as "null steering" since the null can be shifted to an alternative position about the antenna (e.g., to reduce interference). In some embodiments, the second active tuning element 20 may include a switch for connecting the second parasitic to ground when "On" and for terminating the short when "Off". It should however be noted that a variable reactance on either of the first or second parasitic elements, for example by using a variable capacitor or other tunable component, may further provide a variable shifting of the antenna pattern or the frequency response. For example, the first active tuning element 16 and/or second active tuning element 18 may include at least one of a tunable capacitor, MEMS device, tunable inductor, switch, a tunable phase shifter, a field-effect transistor, or a diode.

Figure 1B:
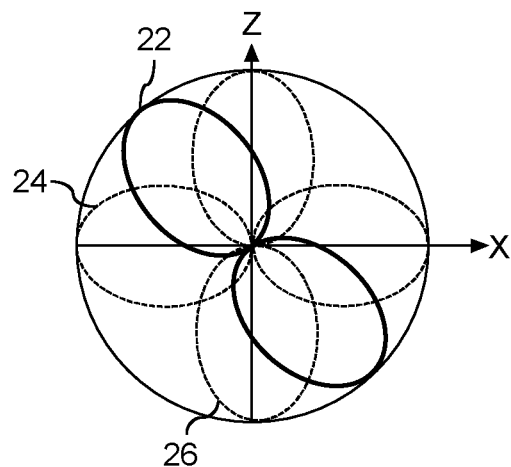
FIG. 1B illustrates a two-dimensional antenna radiation pattern associated with the antenna of FIG. 1A.

FIG. 1B illustrates a two-dimensional antenna radiation pattern associated with the modal antenna of FIG. 1A. The radiation pattern may be shifted by controlling an electrical characteristic associated with at least one of the first and second parasitic elements 15, 18 of the modal antenna 10. For example, in some embodiments, the radiation pattern may be shifted from a first mode 22 to a second mode 24, or a third mode 26.

Figure 1C:
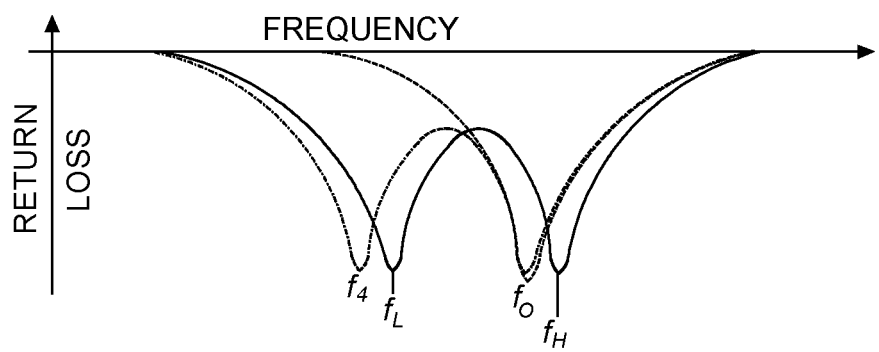
FIG. 1C illustrates an example frequency plot of the antenna of FIG. 1A according to example embodiments of the present disclosure.

FIG. 1C illustrates an example frequency plot of the modal antenna of FIG. 1A according to some aspects of the present disclosure. The frequency of the antenna can be shifted by controlling an electrical characteristic associated with at least one of the first or second parasitic elements 15, 18 of the modal antenna 10. For example, a first frequency ($f_0$) of the antenna may be achieved when the first and second parasitic elements are switched "Off"; the frequencies ($f_L$) and ($f_H$) may be produced when the second parasitic is shorted to ground; and the frequencies ($f_4$; $f_0$) may be produced when the first and second parasitic elements are each shorted to ground. It should be understood that other configurations are possible within the scope of this disclosure. For example, more or fewer parasitic elements may be employed. The positioning of the parasitic elements may be altered to achieve additional modes that may exhibit different frequencies and/or combinations of frequencies.

FIGS. 1A-1C depict one example modal antenna having a plurality of modes for purposes of illustration and discussion. Those of ordinary skill in the art, using the disclosures provided herein, will understand that other modal antennas and/or antenna configurations can be used without deviating from the scope of the present disclosure. As used herein a "modal antenna" refers to an antenna capable of operating in a plurality of modes where each mode is associated with a distinct radiation pattern.

Figure 2:
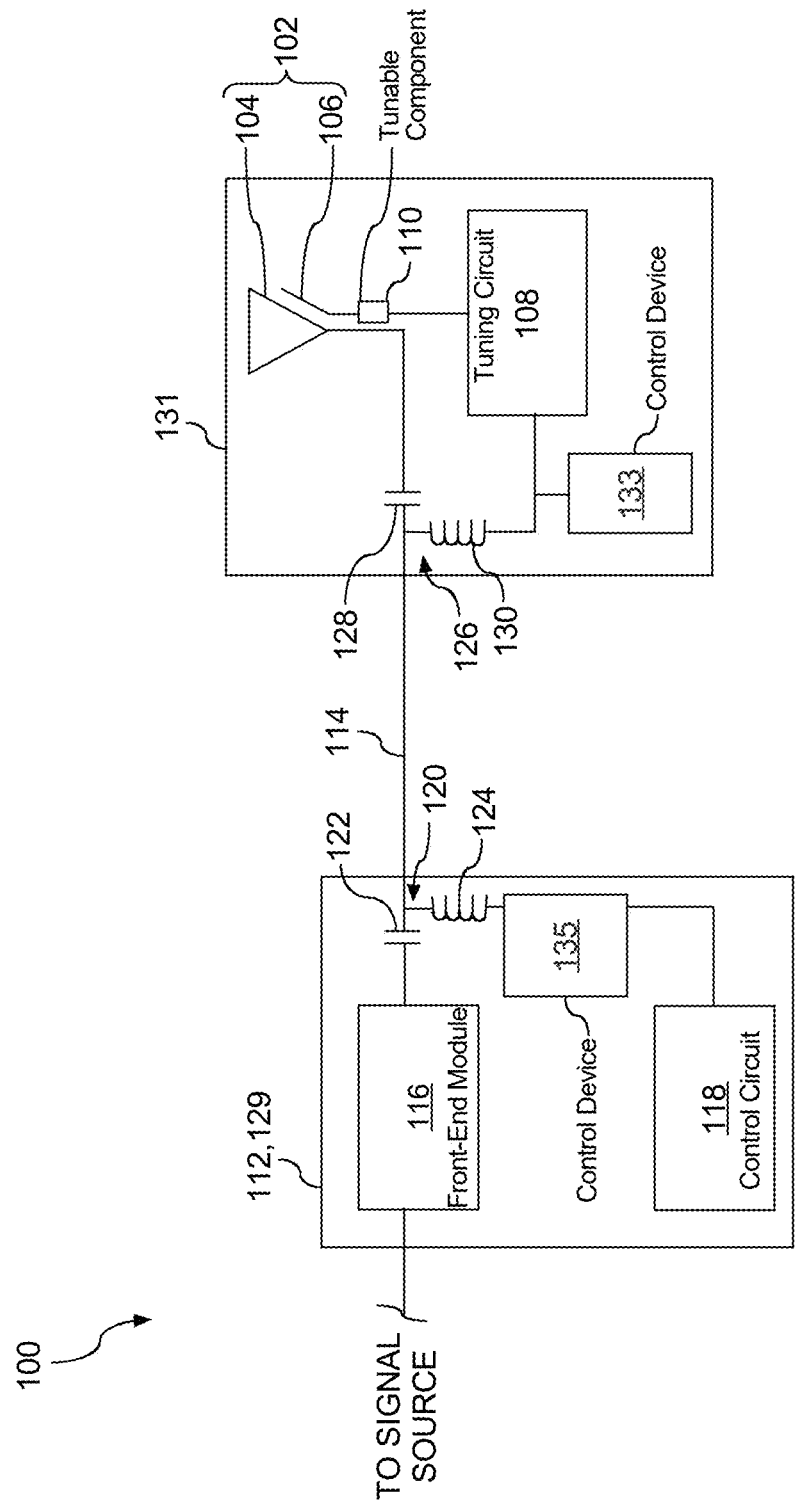
FIG. 2 illustrates a schematic diagram of an example antenna system according to example embodiments of the present disclosure.

FIG. 2 illustrates a schematic diagram of an embodiment of an antenna system 100 in accordance with example aspects of the present disclosure. The antenna system 100 may include a modal antenna 102. The modal antenna 102 may include a driven element 104 and a parasitic element 106 positioned proximate to the driven element 104. The modal antenna 102 may be operable in a plurality of different modes. Each mode may be associated with a different radiation pattern, for example as described above with reference to FIGS. 1A through 1C.

A tuning circuit 108 (e.g., a receiver) may be configured to control an electrical characteristic associated with the parasitic element 106 to operate the modal antenna 102 in the plurality of different modes. The tuning circuit 108 may be configured demodulate a control signal from a transmit signal and control the electrical characteristic of the parasitic element 106 based on control instructions associated with the control signal, for example as explained in greater detail with reference to FIGS. 4 and 5.

A tunable component 110 may be coupled with the parasitic element 106. The tuning circuit 108 may be configured to control the tunable component 110 to alter the electrical connectivity of the parasitic element 106 with a voltage or current source or sink, such as connecting the parasitic element 106 with ground.

A radio frequency circuit 112 (e.g., a transmitter) may be configured to transmit an RF signal to the driven element 104 of the modal antenna 102. For example, a transmission line 114 may couple the radio frequency circuit 112 to the modal antenna 102. In some embodiments, the transmission line 114 may be a single coaxial cable. The radio frequency circuit 112 may be configured to amplify or otherwise generate the RF signal, which is transmitted through the transmission line 114 (as a component of the transmit signal) to the driven element 104 of the modal antenna 102.

In some embodiments, the radio frequency circuit 112 may include a front-end module 116 and/or a control circuit 118. The front-end module 116 may be configured to generate and/or amplify the RF signal that is transmitted to the driven element 104. The control circuit 118 may be configured to modulate a control signal onto the RF signal using amplitude-shift keying modulation to generate the transmit signal, for example as explained in greater detail below with reference to FIGS. 4A and 4B.

The transmission line 114 may be coupled with various components (e.g., using Bias Tee circuits) that are configured to aid in the combination and/or separation of signals occupying various frequency bands. For example, a first Bias Tee circuit 120 may couple the front-end module 116 and the control circuit 118 with the transmission line 114. The first Bias Tee circuit 120 may include a capacitor 122 coupling the transmission line 114 with front end module 116 and an inductor 124 coupling the control circuit 118 with the transmission line 114. A second Bias Tee circuit 126 may couple the driven element 104 and the tuning circuit 108 with the transmission line 114. The second Bias Tee circuit 126 may include a capacitor 128 coupling the transmission line 114 with the driven element 104 and an inductor 130 coupling the transmission line 114 with the tuning circuit 108.

The front-end module 116 may transmit the RF signal through the capacitor 122 of the first Bias Tee circuit 120. The control circuit 118 may modulate the control signal onto the RF signal through the inductor 124 of the first Bias Tee circuit 120 to generate the control signal in the transmission line 114.

The tuning circuit 108 (e.g., receiver) may be configured to de-modulate the control signal and extract clock information associated with the transmitter. For example, the tuning circuit 108 may de-modulate the control signal from the transmit signal via the inductor 130 of the second Bias Tee circuit 126. The RF signal component of the transmit signal may be transmitted to the driven element 104 of the modal antenna 102 via the capacitor 128 of the second Bias Tee circuit 126.

In some embodiments, the antenna system 100 may further include a control device 133 (e.g., a back-channel modulator). As will be discussed in greater detail below with reference to FIG. 6, the control device 133 can be any suitable current source, such as a switchable current source. In some embodiments, the control device 133 can be positioned between the second Bias Tee circuit 126 and the tuning circuit 108. For example, the control device 133 can be positioned between and coupled to the inductor 130 and the tuning circuit 108. As will be discussed in greater detail below with reference to FIGS. 8-14, the control device 133 can be configured to generate an acknowledgement (ACK) signal and to transmit that ACK signal over the transmission line 114 to the radio frequency circuit 112.

In some embodiments, the antenna system 100 may further include a control device 135 (e.g., a back-channel receiver). As will be discussed in greater detail below with reference to FIG. 7, the control device 135 can be any suitable current-sensing device, such as a high-side current sensing circuit. In some embodiments, the control device 135 can be positioned between the first Bias Tee circuit 120 and the control circuit 118. For example, the control device 135 can be positioned between and coupled to the inductor 124 and the control circuit 118. As will be discussed in greater detail below with reference to FIG. 15, the control device 135 can be configured to sense and decode an acknowledgement (ACK) signal generated by the control device 133.

In some embodiments, the antenna system 100 may include a first circuit board 129 and a second circuit board 131 that is physically separate from the first circuit board 129. The radio frequency circuit 112 and control device 135 may be disposed on the first circuit board 129. An antenna circuit comprising at least one of the tuning circuit 108 or the modal antenna 102 may be disposed on the second circuit board 131. In some embodiments, the control device 133 may also be disposed on the second circuit board 131. This may allow radio frequency circuit 112 to be physically separated from the tuning circuit 108 and/or modal antenna 102 without employing multiple transmission lines or adversely affecting the operation of the antenna system 100.

In some embodiments, the RF signal may be defined within a first frequency band. The control signal may be defined within a second frequency band that is distinct from the first frequency band. For example, the first frequency band may range from about 500 MHz to about 50 GHz, in some embodiments from about 1 GHz to about 25 GHz, in some embodiments from about 2 GHz to about 7 GHz, e.g., about 5 GHz. The second frequency band may range from about 10 MHz to about 1 GHz, in some embodiments from about 20 MHz to about 800 MHz, in some embodiments from about 30 MHz to about 500 MHz, in some embodiments from about 50 MHz to about 250 MHz, e.g., about 100 MHz.

Figure 3:
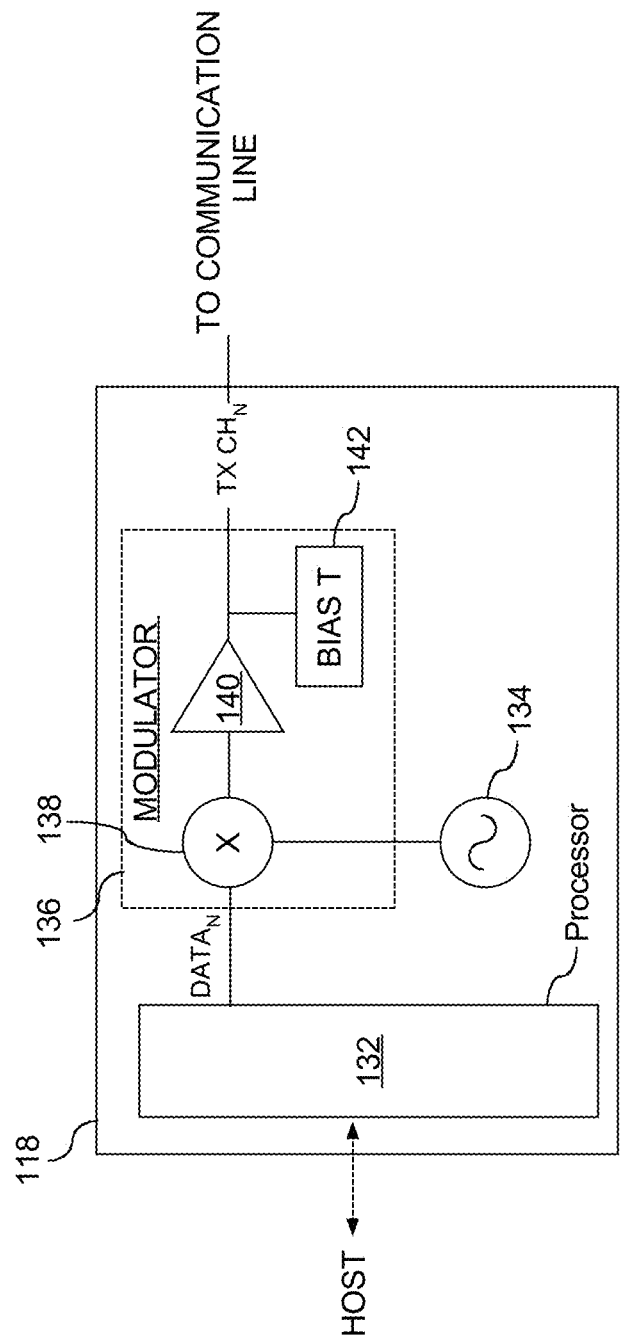
FIG. 3 illustrates a schematic diagram of an example control circuit of the antenna system according to example embodiments of the present disclosure.

FIG. 3 illustrates a schematic diagram of one embodiment of the control circuit 118 of the antenna system 100 illustrated in FIG. 2. The control circuit 118 can include a processor 132. The processor 132 can be configured to generate or receive control instructions for changing the mode of the modal antenna 102 (illustrated in FIG. 2), or otherwise adjusting the orientation or frequency of the radiation pattern of the modal antenna 102. For example, the processor 132 can receive the control instructions from another processor (represented by HOST in FIG. 3) and can generate an output that contains data (represented by $DATA_N$ in FIG. 3) that describes the instructions. The data can have any suitable bit depth. For example, in some embodiments the data can be in binary format. In other embodiments, the data can be in hexadecimal format, decimal format, etc. As will be discussed in detail below, the data can be encoded with a coding scheme that increases error detection according to example embodiments of the present disclosure.

The control circuit 118 can also include a carrier signal source 134. In some embodiments, the carrier signal source 134 can be configured to generate a carrier signal that includes a sinusoidal wave, which can have a generally constant frequency. In other embodiments, the carrier signal can be or include any suitable signal. For example, in some embodiments, the carrier signal can be or include any suitable repeating pattern, and is not limited to being sinusoidal or having a generally constant frequency.

The control circuit 118 can also include a modulator 136 that is configured to modulate the output of the processor onto the carrier signal to produce the control signal (represented by $TX\ CH_N$ in FIG. 3). The modulator 136 can include a multiplexer 138 that is configured to combine the output containing the data (represented by $DATA_N$ in FIG. 3), which can describe the control instructions, with the carrier signal from the carrier signal source 134. For example, the modulator 136 can be configured to scale the amplitude of the carrier signal from the carrier signal source 134 to produce the control signal, for example by performing amplitude shift keying modulation (e.g., on-off keying modulation), for example as described in greater detail below with reference to FIG. 4. The modulator 136 can also include an amplifier 140 and a Bias Tee circuit 142.

FIG. 4A illustrates a series of time-aligned charts 400 representing a simplified example of binary amplitude-shift keying modulation. A binary signal 401 may alternate between a first voltage level 402 and a second voltage level 404 in a manner that describes the binary data set. The binary signal 401 may correspond to a simplified example of the output of processor 132, which may contain the data describing the control instructions, for example as described above with reference to FIG. 3. Amplitude-shift keying modulation may include representing the binary signal 401 by representing the first voltage level 402 as a sinusoidal signal 406 having a varying amplitude. For example, the sinusoidal signal 406 may have a first amplitude 408 that represents the first voltage level 402 of the binary signal 401. The sinusoidal signal 406 may have a second amplitude 410 that represents the second voltage level 404 of the binary signal 401.

Figure 4B:
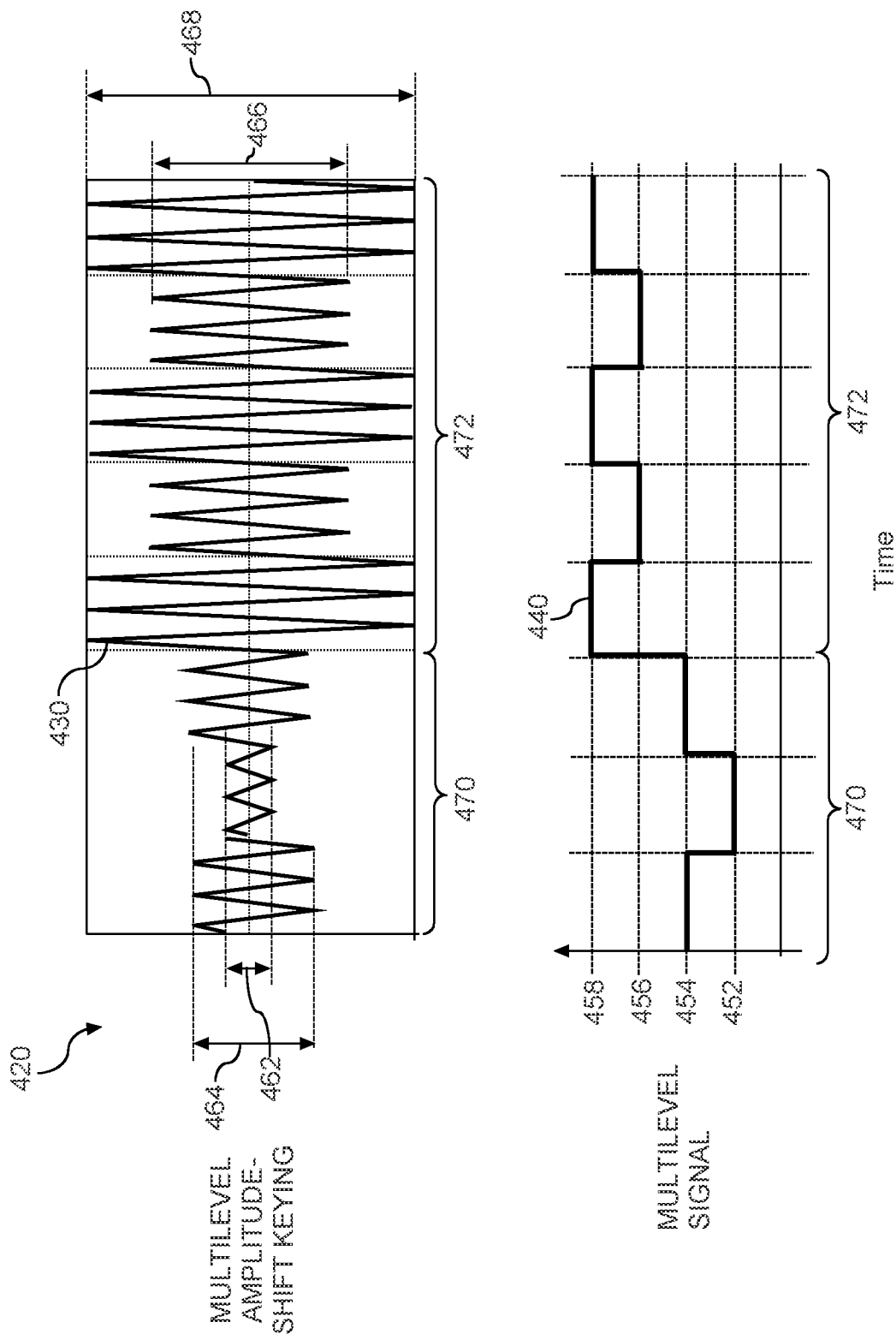
FIG. 4B illustrates a series of time-aligned charts representing simplified examples of multilevel amplitude-shift keying modulation.

FIG. 4B illustrates another series of time-aligned charts 420 representing a simplified example of multilevel amplitude-shift keying modulation. Multilevel amplitude-shift keying modulation may include representing a data signal having greater bit depth than two. In other words, the data signal may be "m-ary," where m represents an integer greater than two. The multilevel signal 440 may switch between a plurality of voltage levels 452, 454, 456, 458, in a manner that describes a data set having a bit depth greater than two. The voltage levels 452, 454, 456, 458 of the multilevel signal 440 may be represented as a sinusoidal signal 430 having varying amplitudes. For example, each of the voltage levels 452, 454, 456, 458 of the multilevel signal 440 may be associated with a respective amplitude 462, 464, 466, 468 of the sinusoidal signal 430. The multilevel signal 440 may correspond to a simplified example of the output of the processor 132, which may contain the data describing the control instructions, for example as described above with reference to FIG. 3.

As indicated above, in some embodiments, the receiver (e.g., tuning circuit 108) may be configured to extract clock information from the transmit signal. The receiver may be configured to synchronize its operations (e.g., control an electrical characteristic associated with the parasitic element 106 to operate the modal antenna 102 in a plurality of different modes) with operations of the transmitter (e.g., the radio frequency circuit 112) based on the extracted clock information. For example, in some embodiments, the receiver may be free of a clock source that is separate from the clock source of the transmitter (e.g., the carrier signal source 134 associated with the control circuit 118). In other embodiments, the receiver may include a clock source that is not utilized. Instead, the receiver may rely on the extracted clock information associated with the clock source of the transmit signal.

In some embodiments, the control signal may include a data frame that includes a training portion 470. The tuning circuit (e.g., receiver) may be configured to recognize the training portion 470 within the data frame to identify at least one of a start or an end of the data frame. For example, referring to FIG. 4B, the vertical dotted lines in the plot of the multilevel signal 440 may represent divisions between bits. A byte may include 8 bits, for example as illustrated in FIG. 4B.

The data frame may also include a data portion 472 that contains or describes data (e.g., control instructions for adjusting a mode of the modal antenna, as discussed above with reference to FIG. 1A through 1C). The receiver may also be configured to locate the data portion 472 within the data frame based on the identified location of the training portion 470 within the data frame. The training portion 470 may include a pre-determined series of bits and/or have a pre-determined location within the data frame. For instance, as illustrated in FIGS. 4A and 4B, the training portion 470 may include a set of consecutive bits at the start of the data (e.g., the first three bits). The data portion 472 may include another set of consecutive bits (e.g., the next five bits after the training portion 470). The training portion 470 may have any suitable bit-depth, length, and location within the data frame. Similarly, data portion 472 may have any suitable bit-depth, length, and location within the data frame. The data frame may have any suitable bit-depth and length. As example, in some embodiments, the data frame may include multiple bytes. A single training portion 470 may be included in the data frame, or multiple training portions 470 may be located within the data frame. Thus, the training portion(s) 470 may be configured to provide the receiver with a point of reference such that the receiver can locate the start of the data frame, the end of the data frame, or the data portion 472 within the data frame.

In some embodiments, the transmitter may be configured to modulate a clock signal onto the RF signal using multi-level amplitude-shift keying. The receiver may be configured to de-modulate the control signal and extract the clock signal including clock information associated with the transmitter from the RF signal. For example, referring to FIG. 4B, the clock signal may be or include at least a portion of the training portion 470. The receiver may be configured to identify the location of the data portion 472 within the data frame based on the clock information associated with the transmitter.

In some embodiments, the transmitter may be configured to modulate the clock signal onto the RF signal using a first set of amplitude levels and modulate the control signal onto the RF signal using a second set of amplitude levels that includes at least one amplitude level that is distinct from the first set of amplitude levels. As an example, in one embodiment, the clock signal may be represented or described at least partially within the training portion 470. Referring to FIG. 4B, in a simplified example, the first set of amplitude levels may correspond to amplitudes 462, 464 of the sinusoidal signal 430 and voltage levels 452, 454 of the multilevel signal 440. The second set of amplitude levels may correspond to amplitudes 466, 468 of the sinusoidal signal 430 and voltage levels 456, 458 of the multilevel signal 440. In this example, the first set of amplitude levels (associated with the control signal) is completely discrete from the second set of amplitude levels (associated with the clock signal). However, in other embodiments, the first set and second set of amplitude levels may partially overlap (e.g., may contain one or more of the same amplitude levels). This configuration may allow the receiver to more accurately and reliably locate and extract the clock signal and information from the RF signal.

Figure 5:
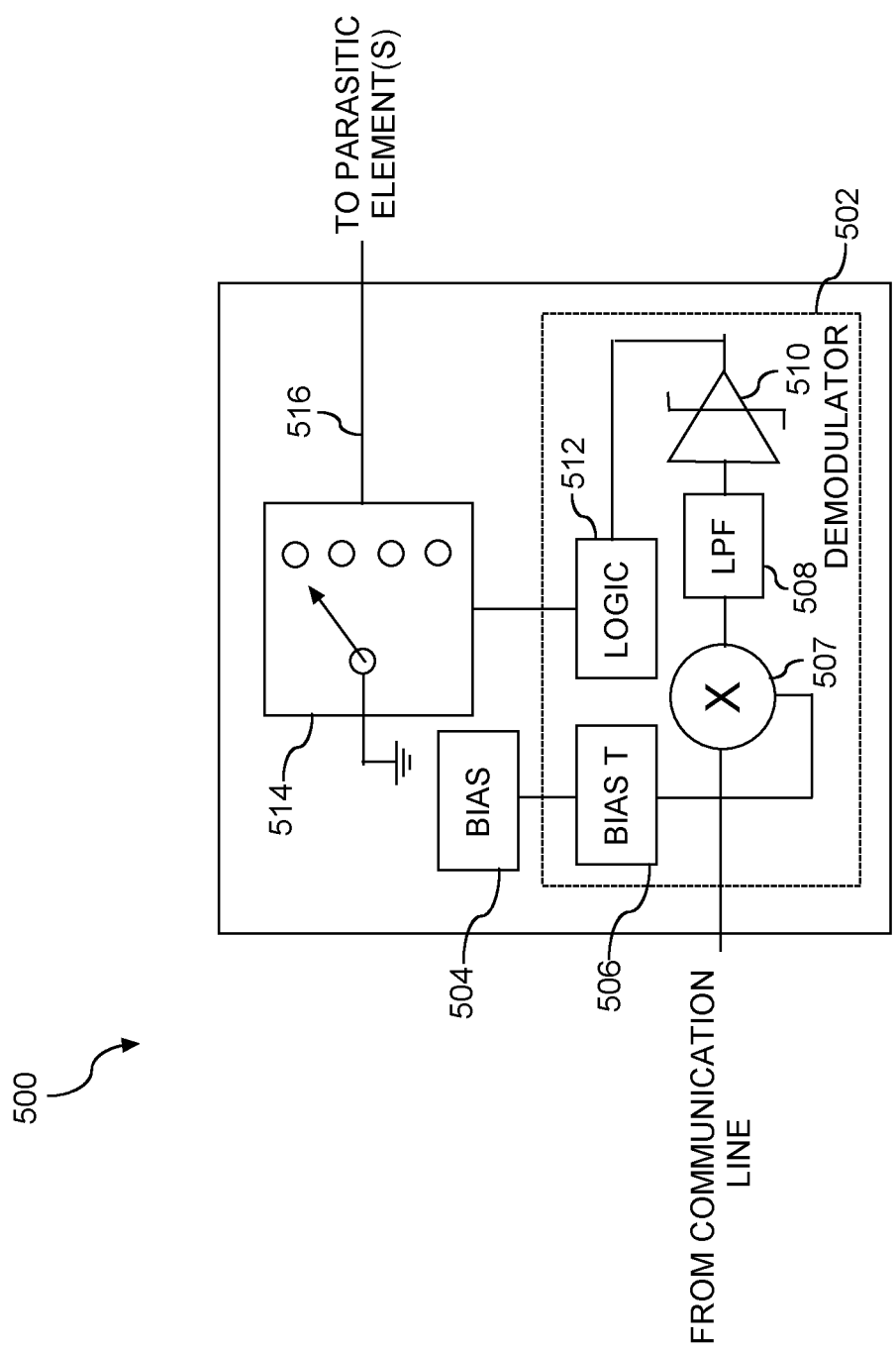
FIG. 5 illustrates a schematic diagram of an example tuning circuit of the antenna system according to example embodiments of the present disclosure.

FIG. 5 illustrates a schematic diagram of one embodiment of the tuning circuit 500 (e.g., the receiver), for example corresponding to the tuning circuit 108 discussed above with reference to FIG. 2, in accordance with aspects of the present disclosure. The tuning circuit 500 may include a demodulator 502 and a bias 504. The demodulator 502 may include a Bias Tee circuit 506 coupled with the bias 504 and a multiplexer 507 that is coupled with the transmission line 114 (illustrated in FIG. 2).

The tuning circuit 500 may also include a low pass filter 508 that is configured to filter at least one frequency band. For example, the low pass filter 508 may be configured to filter at least one frequency band that is higher than the frequency of the carrier signal frequency. As such, the low pass filter 508 may isolate or relatively increase the strength of the carrier signal frequency. The demodulator 502 may also include a diode 510, such as a Zener diode. The diode 510 may be coupled with a logic circuit 512 that is configured to interpret the control instructions associated with (e.g., contained within) the control signal.

The logic circuit 512 (e.g., processors, ASICS, etc. configured to execute computer-readable instructions to implement logic operations) may also be configured to control the operation of a switch 514 based on the control instructions associated with (e.g., contained within) the control signal. The switch 514 may be connected with ground and be configured to switch between one or more of a plurality of states. For example, the switch 514 may be configured to selectively connect an output 516 of the switch 514 with ground or otherwise vary the electrical connectivity of the output 516 to control an electrical characteristic associated with the parasitic element 106 (illustrated in FIG. 2) and operate the modal antenna in the plurality of different modes. For example, the switch 514 may be configured to adjust the operation of the tunable component 110 (illustrated in FIG. 2) to alter the electrical connectivity of the parasitic element 106 with a source or sink (e.g., a voltage source/sink or current source/sink). For example, the switch 514 may be configured to selectively connect the parasitic element 106 with ground.

In some embodiments, the tuning circuit 500 (e.g., the receiver) may be free of a clock source. For example, the receiver may be configured to de-modulate the control signal and extract clock information associated with the transmitter. The receiver may synchronize its operations with the transmitter based on the extracted clock information instead of employing a clock source that is separate from the clock source of the receiver. For example, the logic circuit 512 of the tuning circuit 500 (e.g., the receiver) may not employ a clock source that is separate from the clock source of the transmitter (e.g., the carrier signal source 134 associated with the control circuit 118). Instead, the tuning circuit 500 (e.g., the receiver) may synchronize its operations with the control circuit 118 (e.g., the transmitter) based on the extracted clock information. For example, the tuning circuit 500 may be configured to demodulate the control signal. For example, the logic circuit 512 may be configured to sample the received signal (e.g., from the diode 510), extract clock information from the received signal, and then locate the data portion within the received signal using the clock information, for example as described above with reference to FIGS. 4A and 4B.

In some embodiments, the receiver may be configured to sample the transmit signal at a frequency that is significantly greater than a signal frequency associated with the transmit frequency. For example, the signal frequency associated with the transmit frequency may correspond with a frequency of the carrier signal (e.g., the sinusoidal signal 430 described above with reference to FIG. 4A). As another example, the signal frequency associated with the transmit frequency may correspond with a frequency at which the amplitude of the carrier signal (e.g., sinusoidal signal 430) changes or switches between amplitude levels.

The receiver may be configured to sample the transmit signal at a sampling frequency that is sufficiently greater than the signal frequency associated with the transmit frequency such that changes in the amplitude of the carrier signal can be detected with sufficient accuracy to de-modulate the control signal and/or clock signal from the transmit signal and decipher data (e.g., instructions) contained therein. For example, the receiver may be configured to sample the transmit signal at a sampling frequency that is at least the Nyquist rate or Nyquist frequency of the signal frequency. In some embodiments, the receiver may be configured to sample the transmit frequency at a sampling frequency that is a pre-determined multiple of the signal frequency associated with the transmit frequency. For example, in some embodiments, the frequency may be 2 to 1,000 times greater than the signal frequency, in some embodiments 5 to 500 times, and in some embodiments 10 to 100 times greater.

Figure 6:
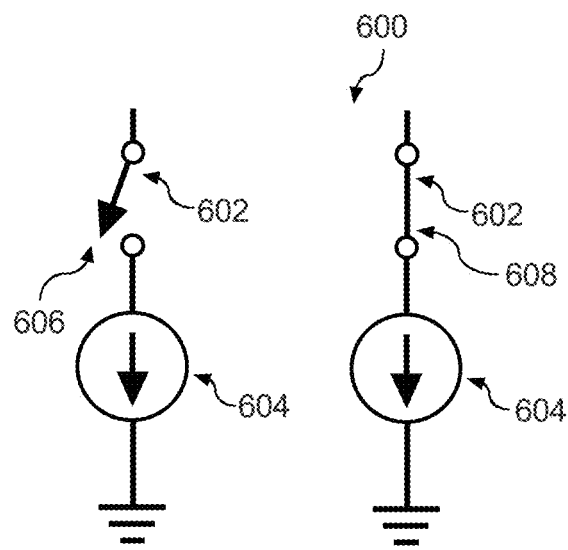
FIG. 6 illustrates a schematic diagram of an example back-channel modulator of the antenna system according to example embodiments of the present disclosure.

FIG. 6 illustrates a schematic diagram of an example embodiment of the back-channel modulator 600 (e.g., a switchable current source), for example corresponding to the control device 133 discussed above with reference to FIG. 2, in accordance with example aspects of the present disclosure. The back-channel modulator 600 may include a switching device 602 and a current source 604.

The switching device 602 can be used to control operation of the back-channel modulator 600. More specifically, the switching device 602 can be used to selectively couple the current source 604 to the tuning circuit 108 (shown in FIG. 2) and the second Bias Tee circuit 126 (shown in FIG. 2). For instance, the switching device 602 can be a single-pole-single-throw (SPST) switch movable between a first position 606 and a second position 608. When the switching device 602 is in the first position 606, the current source 604 is not coupled to the tuning circuit 108 and the second Bias Tee circuit 126. However, when the switching device 602 is in the second position 608, the current source 604 can be triggered to send a current pulse to the control device 135 (shown in FIG. 2).

The switching device 602 can also include, for instance, a transistor, an integrated circuit, an ON/OFF circuit interrupter, such as a toggle switch, relay (mechanical, electrical, or digital), a double-pole-single-throw (DPST) switch, or other switching device. Aspects of the present disclosure are discussed with reference to a SPST switch for purposes of illustration and discussion. Those of ordinary skill in the art, using the disclosures provided herein, will understand that aspects of the present disclosure can be implemented using any suitable switching device without deviating from the scope of the present disclosure.

Figure 7:
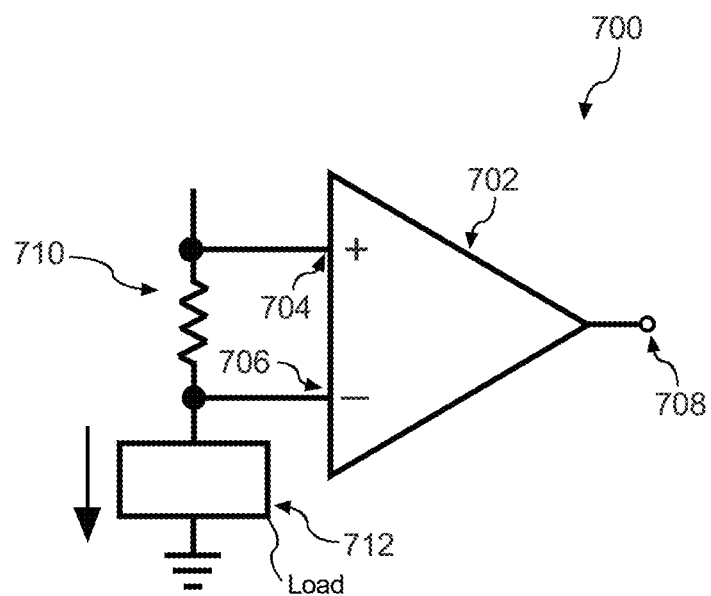
FIG. 7 illustrates a schematic diagram of an example back-channel receiver of the antenna system according to example embodiments of the present disclosure.

FIG. 7 illustrates a schematic diagram of an example embodiment of a back-channel receiver 700 (e.g., a current sensor), for example corresponding to the control device 135 discussed above with reference to FIG. 2, in accordance with example aspects of the present disclosure.

The back-channel receiver 700 can include an operational amplifier 702 having a non-inverting input 704, an inverting input 706, and an output 708. The back-channel receiver 700 can also include a current sensing device, such as a current-sense resistor 710 positioned between and coupling the non-inverting input 704 and the inverting input 706. The back-channel receiver 700 can also include a load 712 positioned between the current-sense resistor 710 and ground.

In example embodiments, the back-channel receiver 700 can be operated as a current sensor. For instance, the back-channel receiver 700 can be configured to sense a current pulse produced by the back-channel modulator 600 (shown in FIG. 6) and provide a signal indicative of the current to the control circuit 118 (shown in FIG. 2). More specifically, the operational amplifier 702 can be configured to monitor and/or sense a current flowing into inductor 124 and provide a signal indicative of the received current pulse via the output 708 to the control circuit 118.

The back-channel receiver 700 can also be any device suitable to sense the current pulse generated by the back-channel modulator 600. Aspects of the present disclosure are discussed with reference to a high-side current-sensing circuit in FIG. 7 for purposes of illustration and discussion. Those of ordinary skill in the art, using the disclosures provided herein, will understand that aspects of the present disclosure can be implemented using any suitable current-sensing device without deviating from the scope of the present disclosure.

Referring now to FIGS. 6 and 7, and as will be discussed in greater detail below with reference to the method 800 of FIG. 8, the tuning circuit 108 (shown in FIG. 2) can, in some implementations, trigger the back-channel modulator 600 to send a pulsed DC current signal in response to an acknowledgement (ACK) request received from the radio frequency circuit 112 (shown in FIG. 2). The antenna system 100 can be configured to facilitate transmission of the pulsed DC current signal to the back-channel receiver 700 via the transmission line 114 (shown in FIG. 2). The back-channel receiver 700 can be configured to sense the pulsed DC current signal generated by the back-channel modulator 600. In some implementations, the back-channel receiver 700 can be configured to decode the pulsed DC current signal received from the back-channel modulator 600 as an acknowledgement (ACK) signal.

Figure 8:
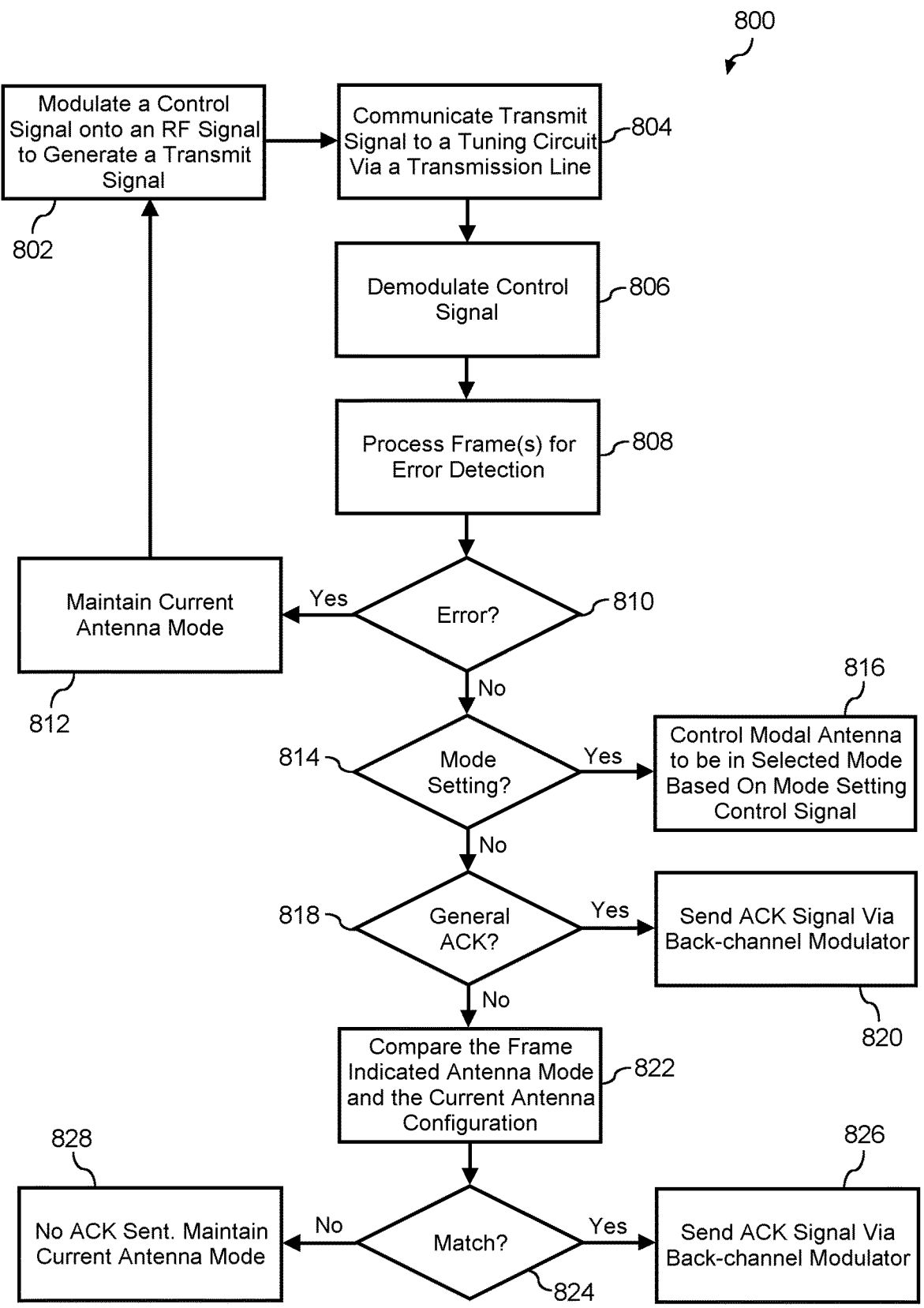
FIG. 8 depicts a flow diagram of an example method according to example embodiments of the present disclosure.

FIG. 8 depicts a flow diagram of an example method 800 according to example embodiments of the present disclosure. FIG. 8 depicts steps performed in a particular order for purposes of illustration and discussion. Those of ordinary skill in the art, using the disclosures provided herein, will understand that various steps of any of the methods described herein can be omitted, expanded, performed simultaneously, rearranged, and/or modified in various ways without deviating from the scope of the present disclosure. In addition, various steps (not illustrated) can be performed without deviating from the scope of the present disclosure. Additionally, the method 800 is generally discussed with reference to the antenna system 100 described above with reference to FIG. 2. However, it should be understood that aspects of the present method 800 can find application with any suitable antenna system including a modal antenna.

The method 800 can include, at (802), modulating a control signal onto an RF signal to generate a transmit signal. For example, the control signal can contain control instructions for changing the mode of the modal antenna or otherwise adjusting the orientation or frequency of the radiation pattern of the modal antenna. For example, the radio frequency circuit 112 can include a control circuit 118 that is configured to modulate the control signal onto the RF signal to generate a transmit signal, for example as described above with reference to FIGS. 3, 4A, and 4B.

The control signal can be implemented in one or more frames. Each frame can include a plurality of bits. The frame(s) can specify a selected mode of the plurality of modes for operation of the modal antenna. The control signal (e.g., instructions) can be encoded with a coding scheme that increases error detection by the tuning circuit. For instance, the coding scheme can assign a unique code to each mode of the plurality of modes.

In some embodiments, the unique code can be encoded using 11 bits or more (e.g., 11 bits, 21 bits). The unique code for each mode can differ by at least two bits relative to the unique code for each other mode in the plurality of modes, such as by at least three bits, such as by at least four bits, such as by at least five bits, such as by at least six bits, such as by at least seven bits, such as by at least eight bits, etc. As a result, the unique code for each mode in the plurality of modes is separated a significant distance (e.g., in terms of binary code) from the unique code for each of the other antenna modes.

Figure 9:
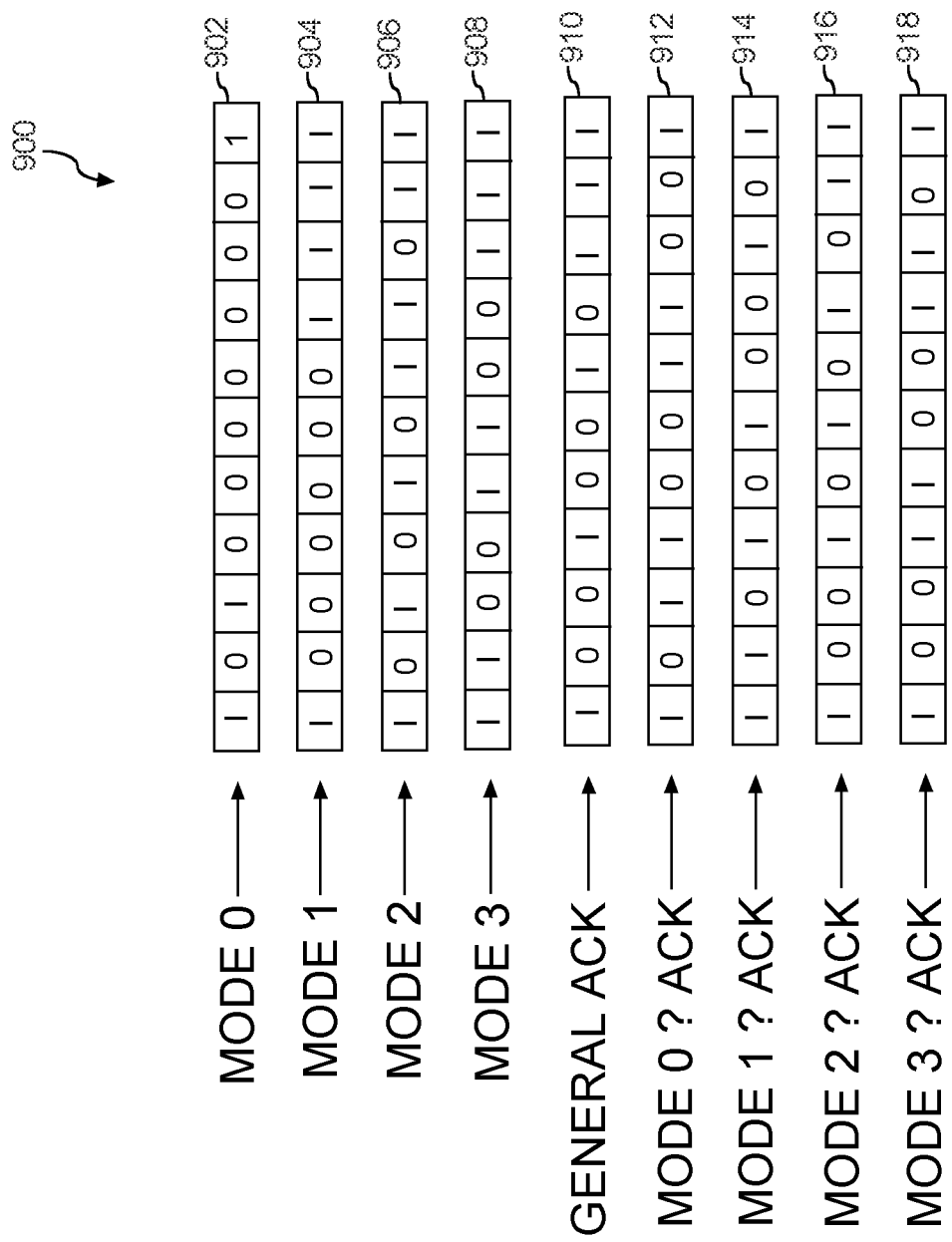
FIG. 9 illustrates an example coding scheme of the antenna system according to example embodiments of the present disclosure.

For instance, FIG. 9 depicts an example coding scheme 900 according to example embodiments of the present disclosure. The coding scheme 900 assigns unique 11-bit codes to each of four different antenna modes: Mode 0, Mode 1, Mode 2, and Mode 3. More particularly, code 902 is assigned to Mode 0. Code 904 is assigned to Mode 1. Code 906 is assigned to Mode 2. Code 908 is assigned to Mode 3. The coding scheme 900 likewise assigns unique 11-bit codes to a general acknowledgement request and each of four different mode-specific acknowledgement requests: General ACK, Mode 0 ACK, Mode 1 ACK, Mode 2 ACK, and Mode 3 ACK. More particularly, code 910 is assigned to General ACK. Code 912 is assigned to Mode 0 ACK. Code 914 is assigned to Mode 1 ACK. Code 916 is assigned to Mode 2 ACK. Code 918 is assigned to Mode 3 ACK.

Aspects of the present disclosure are discussed with reference to four modes for purposes of illustration and discussion. Those of ordinary skill in the art, using the disclosures provided herein, will understand that any number of modes can be used without deviating from the scope of the present disclosure, such as 8 modes, 16 modes, 32 modes, etc. In addition, aspects of the present disclosure are discussed with reference to unique codes implemented in binary format. Those of ordinary skill in the art, using the disclosures provided herein, will understand that other numerical schemes can be used (e.g., decimal, hexadecimal) without deviating from the scope of the present disclosure.

Referring to FIG. 9, the codes 902, 904, 906, 908, 910, 912, 914, 916, and 918 in the coding scheme 900 differ by at least two bits, such as by at least five bits relative to each other. As a result, the codes 902, 904, 906, 908, 910, 912, 914, 916, and 918 are separated a significant distance from each other. This facilitates error detection as discussed below.

Referring to FIG. 8, the method 800 can include, at (804), communicating the transmit signal to a tuning circuit via a single coaxial transmission line. For example, as described above with reference to FIG. 2, the radio frequency circuit 112 can include a front-end module 116 that can communicate the RF signal through a capacitor 122 of a first Bias Tee circuit 120, through a transmission line 114, and through a capacitor 128 of a second Bias Tee circuit 126 to a driven element 104 of a modal antenna 102. The control circuit 118 can modulate a control signal onto the RF signal through the inductor 124 of the first Bias Tee circuit 120, through the transmission line 114, and through the inductor 130 of the second Bias Tee circuit 126 to the tuning circuit 108.

The method 800 can include, at (806), demodulating the control signal at the tuning circuit. For example, as described above with reference to FIGS. 2 and 5, the tuning circuit 108, 500 can be configured to demodulate the control signal from the transmit signal via the inductor 130 of the second Bias Tee circuit 126. The tuning circuit 108, 500 can also be configured to filter and/or amplify the control signal to isolate or relatively increase the strength of a carrier signal frequency associated with a carrier signal. A logic circuit 512 can be configured to obtain and/or interpret control instructions associated with (e.g., contained in) the control signal.

For instance, at (808), the method 800 can include processing the frame(s) of the control signal (e.g., the bits in the control signal) for error detection. For instance, at (810), the logic circuit 512 can process the plurality of bits in the frame(s) to determine whether the unique code matches a unique code in the coding scheme 900.

Figure 10:
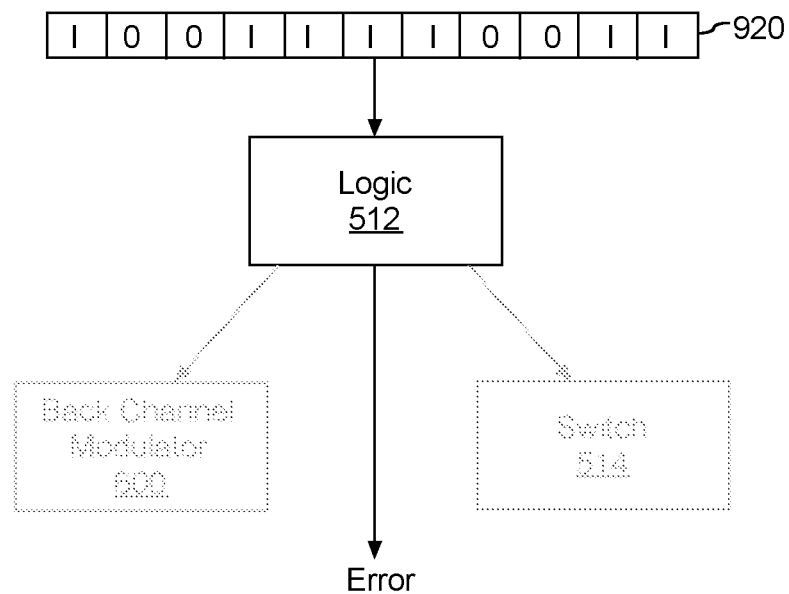
FIG. 10 illustrates example error detection according to example embodiments of the present disclosure.

As an illustrative example, FIG. 10 depicts a logic circuit 512 of an example tuning circuit processing a plurality of bits 920. The plurality of bits 920 differ from each of the plurality of bits associated with unique codes 902, 904, 906, 908, 910, 912, 914, 916, and 918. However, because the plurality of bits 920 do not match a unique code in the coding scheme 900, the logic circuit 512 can easily detect an error. This error detection is facilitated by the unique codes in the coding scheme being separated a significant distance to reduce errors matching with other unique codes.

Referring to FIG. 8 at (810), if an error is detected (e.g., the unique code does not match any of the unique codes in the coding scheme 900), the method 800 can proceed to (812) wherein the tuning circuit maintains the current mode of the antenna. In other words, the tuning circuit does not respond to the control signal containing the error and maintains the modal antenna in its current mode.

Referring to FIG. 8 at (810), if no error is present the method 800 can proceed to (814) to determine whether the unique code matches a unique code assigned to a mode in the coding scheme 900. For instance, the tuning circuit can determine whether the unique code matches any of unique codes 902, 904, 906, and 908.

Referring to FIG. 8 at (814), if the unique code matches a unique code assigned to a mode in the coding scheme 900, the method 800 can proceed to (816) to control the modal antenna in accordance with the selected mode specified by the unique code. For instance, the method 800 can include controlling an electrical characteristic associated with a parasitic element of the modal antenna based at least in part on the control signal to control the modal antenna in the selected mode.

Figure 11:
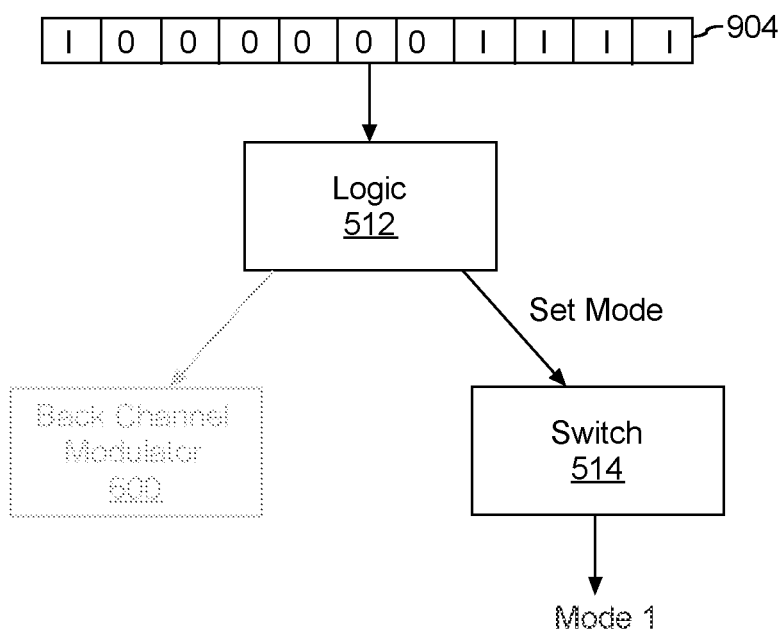
FIG. 11 illustrates example control of a modal antenna according to example embodiments of the present disclosure.

As an illustrative example, FIG. 11 depicts a logic circuit 512 of an example tuning circuit processing a plurality of bits in the frame(s) received over the transmission line. The logic circuit 512 can process the bits and determine that the bits match unique code 904. As discussed above with respect to the coding scheme 900 of FIG. 9, unique code 904 is associated with Mode 1. As a result, the logic circuit 512 can determine that the control signal has control instructions to operate the modal antenna in Mode 1. For instance, as described above with reference to FIG. 5, the logic circuit 512 can control the switch 514 to alter an electrical characteristic associated with the parasitic element 106 (illustrated in FIG. 2) in such a manner that the modal antenna will operate in Mode 1.

Referring to FIG. 8 at (814), if the unique code does not match a unique code assigned to a mode in the coding scheme 900, the method 800 can proceed to (818) to determine whether the unique code matches a unique code assigned to a general acknowledgement request in the coding scheme 900. For instance, the tuning circuit can determine whether the unique code matches unique code 910.

Referring to FIG. 8 at (818), if the unique code matches the unique code 910 assigned to a general acknowledgement request, the method 800 can proceed to (820) to send an acknowledgement (ACK) signal via a back-channel modulator. For instance, the method 800 can include the control device 133 (e.g., back-channel modulator 600) sending an ACK signal to the radio frequency circuit 112 over the transmission line 114.

Figure 12:
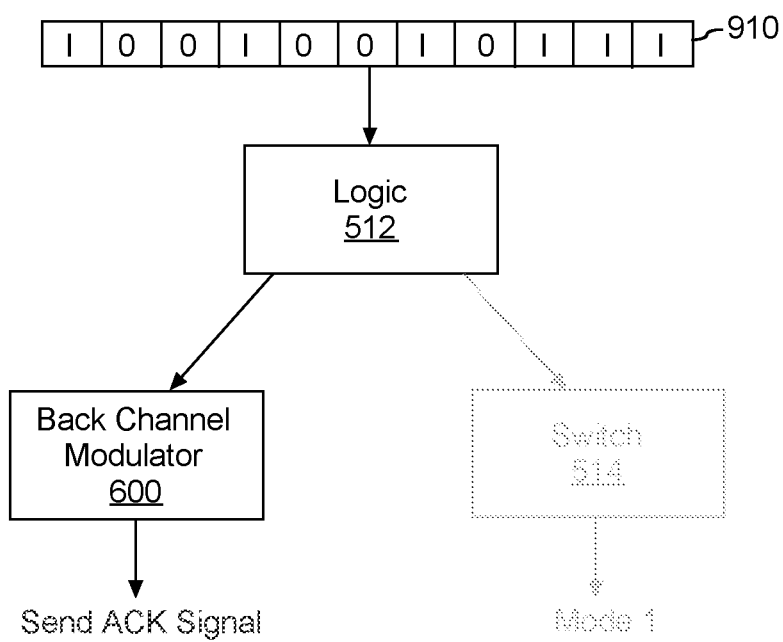
FIG. 12 illustrates an example general acknowledgement of a modal antenna according to example embodiments of the present disclosure.

As an illustrative example, FIG. 12 depicts a logic circuit 512 of an example tuning circuit processing a plurality of bits in the frame(s) received over the transmission line. The logic circuit 512 can process the bits and determine that the bits match unique code 910. As discussed above with respect to the coding scheme 900 of FIG. 9, unique code 910 is associated with a General ACK request. As a result, the logic circuit 512 can determine that the control signal comprises control instructions comprising a general acknowledgement request. In response to determining that the control signal comprises instructions comprising a general acknowledgement request, the control device 133 (e.g., back-channel modulator 600) can send an ACK signal to the radio frequency circuit 112 over the transmission line 114. For instance, as described above with reference to FIG. 6, when the logic circuit 512 determines the control signal comprises instructions comprising a General ACK request, the switching device 602 can be triggered to move from the first position 606 to the second position 608 resulting in the current source 604 becoming coupled to the tuning circuit 108 and the second Bias Tee circuit 126. Additionally, the current source 604 can then be triggered to send the ACK signal (e.g., a current pulse) to the radio frequency circuit 112 over the transmission line 114.

Referring to FIG. 8, if no error is present at (810), the unique code does not match a unique code assigned to a mode at (814) and the unique code does not match a unique code assigned to a general acknowledgement request (818), the unique code is associated with a mode-specific acknowledgement request and the method 800 can proceed to (822). At (822), the method 800 can include comparing a mode associated with the unique code (e.g., the mode associated with the mode-specific acknowledgement request) to the current mode of configuration of the modal antenna. For instance, at (824), the logic circuit 512 can determine whether the current operating mode of the modal antenna matches the mode specified by the unique code associated with a mode-specific acknowledgement request.

Referring to FIG. 8 at (824), if the current operating mode of the modal antenna matches the mode specified by the unique code associated with a mode-specific acknowledgement request, the method 800 can proceed to (826) to send an ACK signal via the back-channel modulator. As discussed above with respect to the general acknowledgement request, the method 800 can include the control device 133 (e.g., back-channel modulator 600) sending an ACK signal to the radio frequency circuit 112 over the transmission line 114.

Figure 13:
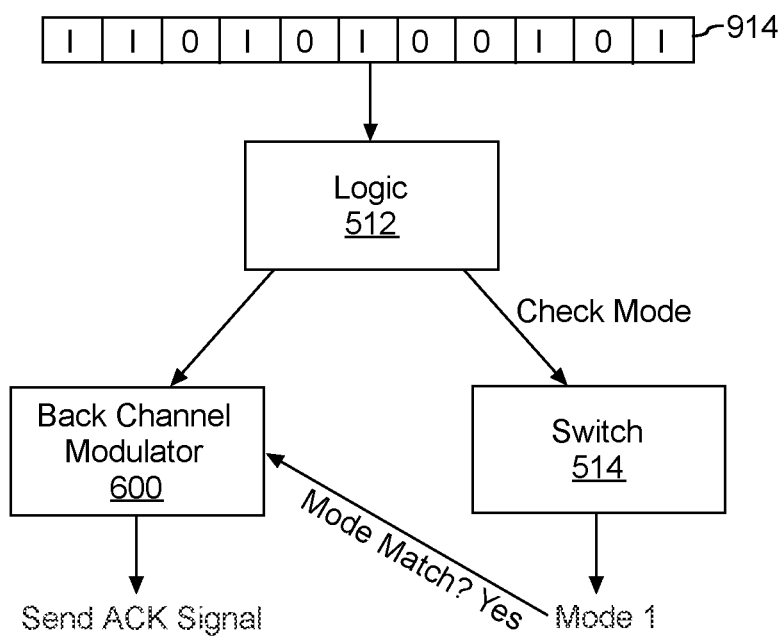
FIG. 13 illustrates an example specific acknowledgment of a modal antenna according to example embodiments of the present disclosure.

As an illustrative example, FIG. 13 depicts a logic circuit 512 of an example tuning circuit processing a plurality of bits in the frame(s) received over the transmission line 114. The logic circuit 512 can process the bits and determine that the bits match unique code 914. As discussed above with respect to the coding scheme 900 of FIG. 9, unique code 914 is associated with a Mode 1 ACK request. The logic circuit 512 can also determine that the modal antenna is currently operating in Mode 1. In response to determining that the modal antenna is operating in the same mode as indicated by the mode-specific acknowledgement request, the control device 133 (e.g., back-channel modulator 600) can send an ACK signal to the radio frequency circuit 112 over the transmission line 114. For instance, as described above with reference to FIGS. 5 and 6, when the logic circuit 512 determines that the control signal comprises a Mode 1 ACK request, the logic circuit 512 can control the switch 514 in such a manner that the modal antenna is operating in Mode 1. In response to determining the modal antenna is operating in the same mode as that indicated by code 914, the control device 133 (e.g., back-channel modulator 600) can be triggered to send an ACK signal to the radio frequency circuit 112 over the transmission line 114 in a similar manner to that described above with reference to FIG. 12.

Referring to FIG. 8 at (824), if the current operating mode of the modal antenna does not match the mode specified by the unique code associated with a mode-specific acknowledgement request, the method 800 can proceed to (828) wherein the control device 133 (e.g., back-channel modulator 600) does not respond to the mode-specific acknowledgement request associated with the unique code and the tuning circuit maintains the current mode of the antenna. In other words, the tuning circuit does not respond to the control signal containing the mode-specific acknowledgement request and maintains the modal antenna in its current operating mode.

Figure 14:
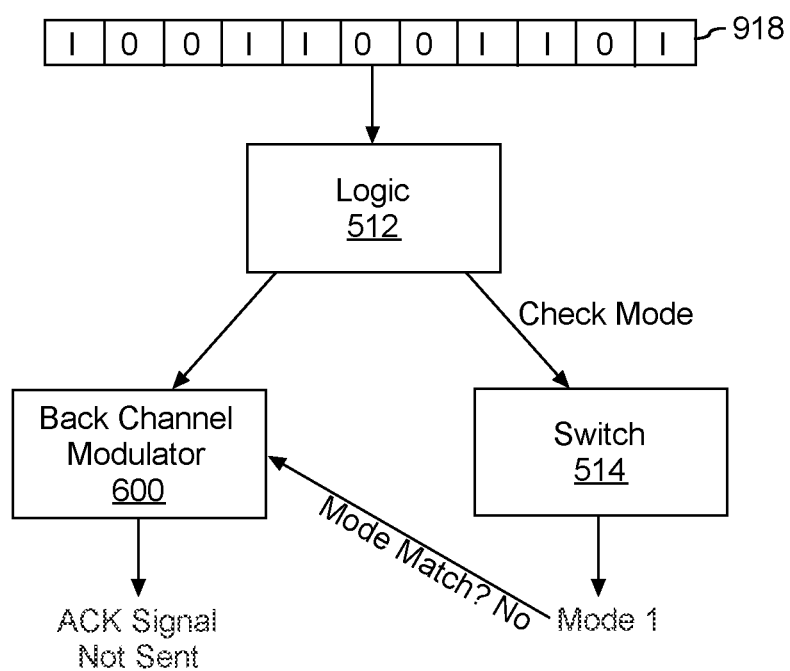
FIG. 14 illustrates an example specific acknowledgment of a modal antenna according to example embodiments of the present disclosure.

As an illustrative example, FIG. 14 depicts a logic circuit 512 of an example tuning circuit processing a plurality of bits in the frame(s) received over the transmission line 114. The logic circuit 512 can process the bits and determine that the bits match unique code 918. As discussed above with respect to coding scheme 900 of FIG. 9, unique code 918 is associated with a Mode 3 ACK request. The logic circuit 512 can also determine that the modal antenna is currently operating in Mode 1. In response to determining that the modal antenna is not operating in the same mode as indicated by the mode-specific acknowledgement request, the control device 133 (e.g., back-channel modulator 600) does not send an ACK signal to the radio frequency circuit 112 and the tuning circuit maintains the modal antenna in Mode 1. For instance, as described above with reference to FIG. 6, the switching device 602 can remain in the first position 606 such that the current source 604 is not coupled to the tuning circuit 108 and the second Bias Tee circuit 126. Thus, the current source 604 will not be triggered to send the ACK signal (e.g., a current pulse) to the radio frequency circuit 112 over the transmission line 114. Additionally, the logic circuit 512 can control the switch 514 in such a manner that the operational mode of the modal antenna remains unchanged.

Figure 15:
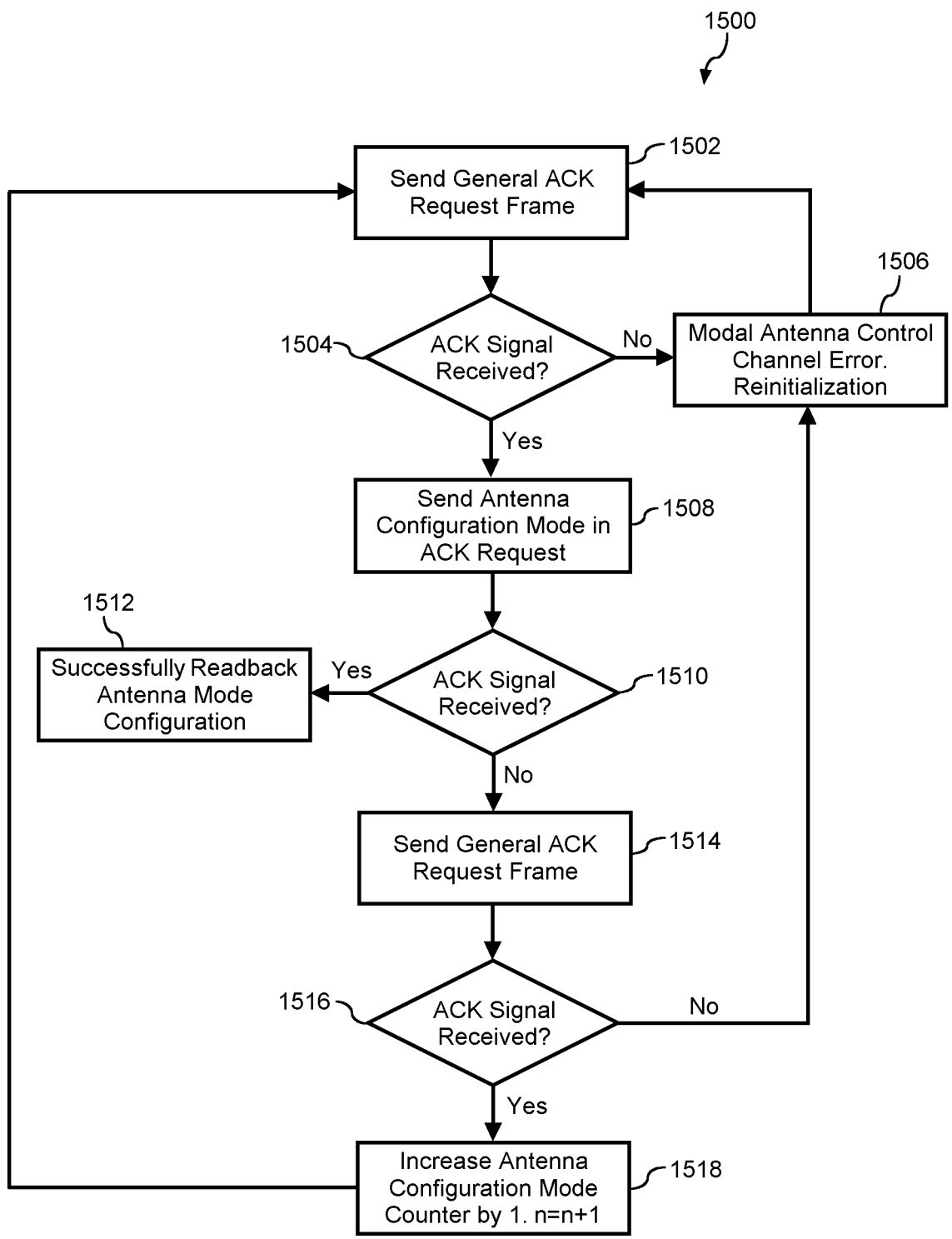
FIG. 15 depicts a flow diagram of an example method according to example embodiments of the present disclosure.

FIG. 15 depicts a flow diagram of an example method 1500 according to example embodiments of the present disclosure. FIG. 15 depicts steps performed in a particular order for purposes of illustration and discussion. Those of ordinary skill in the art, using the disclosures provided herein, will understand that various steps of any of the methods described herein can be omitted, expanded, performed simultaneously, rearranged, and/or modified in various ways without deviating from the scope of the present disclosure. In addition, various steps (not illustrated) can be performed without deviating from the scope of the present disclosure. Additionally, the method 1500 is generally discussed with reference to the antenna system 100 described above with reference to FIG. 2. However, it should be understood that aspects of the present method 1500 can find application with any suitable antenna system including a modal antenna.

The method 1500 can include, at (1502), sending a general acknowledgement (General ACK) request frame. For example, the General ACK request frame can include instructions for generating an acknowledgement (ACK) signal in response to receiving the General ACK request frame. More particularly, the General ACK request frame can include a unique code (e.g., code 910) assigned to the General ACK request in accordance with a coding scheme, such as coding scheme 900 as described above with reference to FIG. 9.

Referring to FIG. 15, the method 1500 can proceed to (1504) to determine whether an ACK signal was successfully received in response to the General ACK request frame sent at (1502). For example, referring to FIGS. 6 and 7, if the back-channel receiver 700 receives a pulsed DC current signal (i.e., the ACK signal) from the back-channel modulator 600 in response to sending the General ACK request frame at (1502), the General ACK request frame was successfully received. However, if the back-channel receiver 700 does not receive a pulsed DC current signal (i.e., the ACK signal) from the back-channel modulator 600 in response to sending the General ACK request frame at (1502), the General ACK request frame was not successfully received.

Referring to FIG. 15 at (1504), if the General ACK request frame sent at (1502) was not successfully received, the method 1500 can proceed to (1506) to determine that a modal antenna control channel error exists. In response to determining that a modal antenna control channel error exists, the method 1500 can perform a reinitialization process and return to (1502).

Referring to FIG. 15 at (1504), if the General ACK request frame sent at (1502) was successfully received, the method 1500 can proceed to (1508). At (1508), the method 1500 can include sending a specific acknowledgement (Specific ACK) request frame. For example, the Specific ACK request frame can include instructions for generating an acknowledgement (ACK) signal in response to receiving the Specific ACK request frame. More particularly, the Specific ACK request frame can include a unique code (e.g., codes 912, 914, 916, 918) assigned to a mode-specific ACK request in accordance with a coding scheme, such as coding scheme 900 as described above with reference to FIG. 9.

Referring to FIG. 15, the method 1500 can proceed to (1510) to determine whether an ACK signal was successfully received in response to the Specific ACK request frame sent at (1508). For example, referring to FIG. 13, if the antenna system 100 is operating in Mode 1, and the Specific ACK request frame sent at (1508) includes Code 914 (i.e., the mode-specific ACK request assigned to a Mode 1 request by coding scheme 900), a pulsed DC current signal (i.e., the ACK signal) is received by the back-channel receiver 700 (shown in FIG. 7). On the other hand, referring to FIG. 14, if the antenna system 100 is operating in Mode 1, and the Specific ACK request frame sent at (1508) includes Code 918 (i.e., the mode-specific ACK request assigned to a Mode 3 request by coding scheme 900), a pulsed DC current signal (i.e., the ACK signal) is not received by the back-channel receiver 700 (shown in FIG. 7).

Referring to FIG. 15 at (1510), if an ACK signal was received in response to the Specific ACK request frame sent at (1508), the method 1500 can proceed to (1512). At (1512), the method 1500 can successfully readback a current operating mode of the antenna system 100. For example, as discussed above, if the Specific ACK request frame sent at (1508) includes, e.g., Code 914, successful receipt of an ACK signal at (1510) can provide a real-time indicator at (1512) confirming that the current operating mode of antenna system 100 is Mode 1.

Referring to FIG. 15 at (1510), if an ACK signal was not received in response to the Specific ACK request frame sent at (1508), the method 1500 can proceed to (1514). At (1514), the method 1500 can include sending a General ACK request frame in a similar manner to that discussed above with reference to (1502) for error detection. For example, as discussed above, if the Specific ACK request frame sent at (1508) includes, e.g., Code 918, and the antenna system 100 is operating in, e.g., Mode 1, a pulsed DC current signal (i.e., the ACK signal) will not be received. In that case, an error detection process must be performed to determine whether the unsuccessful receipt of the pulsed DC current signal (i.e., the ACK signal) at (1510) is due to the antenna system 100 operating in a distinct mode from the mode associated with the Specific ACK request frame sent at (1508), or whether the unsuccessful receipt of the pulsed DC current signal (i.e., the ACK signal) at (1510) is due to a modal antenna control channel error. More specifically, the method 1500 includes performing the error detection process by sending a General ACK request frame at (1514).

Referring to FIG. 15 at (1516), the method 1500 can determine whether an ACK signal was successfully received in response to the General ACK request frame sent at (1514) in a similar manner to that described above with reference to (1504). As mentioned above, the method 1500 performs the error detection process to determine whether the antenna system 100 is operating in a distinct mode from the mode specified in the Specific ACK request sent at (1508), or whether a modal antenna control channel error is present.

Referring to FIG. 15 at (1516), if an ACK signal was not received in response to the General ACK request frame sent at (1514), the method 1500 can proceed to (1506) to determine that a modal antenna control channel error exists. As discussed above with reference to (1506), the method 1500 can perform a reinitialization process in response to determining the modal antenna control channel error exists. In response to performing the initialization process at (1506), the method 1500 can then return to (1502).

Referring to FIG. 15 at (1516), if an ACK signal was received in response to the General Ack request frame sent at (1514), the method 1500 can proceed to (1518) to increase an antenna configuration mode counter. In response to increasing the antenna configuration mode counter, the method 1500 can then return to (1502). For example, if the Specific ACK request frame sent at (1508) includes a unique code associated with Mode 0, the antenna configuration mode counter will increase by an increment of one and return to (1502). Thus, the next Specific ACK request frame will include a unique code associated with Mode 1. In that case, if the method 1500 returns to (1518), the antenna configuration mode counter will increase by another increment of one and return to (1502), such that the next Specific ACK request frame will include a unique code associated with Mode 2. This process can repeat until the antenna configuration mode counter has exhausted each of the plurality of modes of the antenna system 100.

While the present subject matter has been described in detail with respect to specific example embodiments thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An antenna system comprising:
a modal antenna operable in a plurality of modes, each of the plurality of modes associated with a different radiation pattern;
a tuning circuit configured to control the modal antenna to operate in each of the plurality of modes;
a transmission line coupled to the tuning circuit; and
one or more control devices configured to:
modulate a control signal onto a radio frequency (RF) signal to generate a modulated signal for communication over the transmission line to the tuning circuit; and
generate an acknowledgement signal based at least in part on the control signal, wherein:
the control signal comprises a data frame having a plurality of bits; and
the one or more control devices are configured to encode the plurality of bits associated with a selected mode of the plurality of modes in accordance with a coding scheme, the coding scheme specifying a unique code for a general acknowledgement request and a plurality of specific acknowledgement requests.

2. The antenna system of claim 1, wherein the one or more control devices are further configured to communicate the acknowledgement signal over the transmission line.

3. The antenna system of claim 1, wherein the transmission line is a single coaxial cable.

4. The antenna system of claim 1, wherein the coding scheme is configured to specify a unique code for each of the plurality of modes.

5. The antenna system of claim 4, wherein each of the plurality of specific acknowledgement requests is associated with a mode of the plurality of modes.

6. The antenna system of claim 1, wherein the one or more control devices comprise:
a back-channel modulator configured to generate the acknowledgement signal based at least in part on the control signal and to communicate the acknowledgement signal over the transmission line; and
a back-channel receiver configured to detect the acknowledgement signal, the back-channel receiver coupled to the back-channel modulator via the transmission line.

7. The antenna system of claim 6, wherein:
the back-channel modulator is a switchable current source, and
the back-channel receiver is a current sensor.

8. The antenna system of claim 6, further comprising:
a first circuit board comprising the back-channel modulator; and
a second circuit board comprising the back-channel receiver, the second circuit board being physically separate from the first circuit board,
wherein at least one of the tuning circuit or the modal antenna is disposed on the first circuit board.

9. The antenna system of claim 1, wherein:
the modal antenna comprises a driven element and a parasitic element positioned proximate to the driven element, and
the tuning circuit further configured to control one or more electrical characteristics associated with the parasitic element based at least in part on the control signal.

10. A method for controlling a modal antenna comprising:
modulating, by a radio frequency (RF) circuit, a control signal onto an RF signal to generate a modulated signal;
communicating the modulated signal to a tuning circuit via a transmission line;
demodulating, by the tuning circuit, the control signal from the modulated signal;
processing, by the tuning circuit, the control signal to obtain a code;
determining, by the tuning circuit, whether the code comprises an acknowledgement request; and
in response to determining the code comprises the acknowledgement request, communicating an acknowledgement signal to the RF circuit via the transmission line.

11. The method of claim 10, wherein determining whether the code comprises the acknowledgement request further comprises:
determining, by the tuning circuit, whether the code is associated with a selected mode of a plurality of modes of the modal antenna; and
in response to determining the code is not associated with the selected mode of the plurality of modes of the modal antenna, determining, by the tuning circuit, whether the code is an acknowledgement code associated with a mode of the plurality of modes of the modal antenna.

12. The method of claim 11, further comprising:
in response to determining the code is the acknowledgement code associated with the mode of the plurality of modes of the modal antenna, determining, by the tuning circuit, whether the mode associated with the acknowledgement code matches a current mode of the modal antenna.

13. The method of claim 12, further comprising:
in response to determining the mode associated with the acknowledgment code matches the current mode of the modal antenna, communicating the acknowledgement signal to the RF circuit via the transmission line.

14. The method of claim 12, further comprising:
maintaining the current mode of the modal antenna when the mode associated with the acknowledgement code does not match the current mode of the modal antenna.

15. The method of claim 11, further comprising:
in response to determining the code is associated with the selected mode of the plurality of modes of the modal antenna, controlling, by the tuning circuit, an electrical characteristic associated with a parasitic element of the modal antenna based at least in part on the control signal to operate the modal antenna in the selected mode of the plurality of modes.

16. The method of claim 10, wherein communicating the acknowledgement signal to the RF circuit via the transmission line further comprises:

communicating the acknowledgement signal to the RF circuit via the transmission line; and detecting, by the RF circuit, the acknowledgement signal.

17. The method of claim 10, wherein the acknowledgement signal is a single bit DC current increment pulse.

18. An antenna system comprising:
a modal antenna operable in a plurality of modes, each of the plurality of modes associated with a different radiation pattern;
a radio frequency (RF) circuit comprising a front-end module and a first control device;
a transmission line; and
circuitry coupled to the RF circuit via the transmission line and coupled to the modal antenna, the circuitry comprising a tuning circuit and a second control device, the second control device configured to generate an acknowledgement signal and to communicate the acknowledgement signal over the transmission line, the acknowledgement signal acknowledging operation of the modal antenna in a selected mode,
wherein the first control device is configured to detect the acknowledgement signal.

19. The antenna system of claim 18, wherein:
the first control device is a current sensor, and
the second control device is a switchable current source.

* * * * *